United States Patent
Chandra et al.

(10) Patent No.: US 10,353,834 B2
(45) Date of Patent: Jul. 16, 2019

(54) ADAPTER CONFIGURATION FOR A STORAGE AREA NETWORK

(71) Applicant: INTERNATIONAL BUSINESS MACHINES CORPORATION, Armonk, NY (US)

(72) Inventors: Rashmi Chandra, San Jose, CA (US); Ya-Huey Juan, San Jose, CA (US); Jennifer S. Shioya, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 15/042,083

(22) Filed: Feb. 11, 2016

(65) Prior Publication Data

US 2017/0235686 A1    Aug. 17, 2017

(51) Int. Cl.
*G06F 13/16* (2006.01)
*G06F 13/40* (2006.01)

(52) U.S. Cl.
CPC ...... *G06F 13/1668* (2013.01); *G06F 13/4068* (2013.01)

(58) Field of Classification Search
None
See application file for complete search history.

(56) References Cited

U.S. PATENT DOCUMENTS

| 6,085,333 A * | 7/2000 | DeKoning | G05B 9/03 707/999.202 |
| 7,454,605 B2 * | 11/2008 | Bayus | G06F 8/65 713/1 |
| 8,843,624 B2 | 9/2014 | Britsch et al. | |
| 8,935,216 B2 * | 1/2015 | Allison | G06F 11/2002 707/674 |
| 2012/0059991 A1 * | 3/2012 | Cuddihy | G06F 3/0605 711/114 |
| 2012/0185500 A1 * | 7/2012 | Bhogal | G06F 9/5027 707/769 |
| 2012/0297039 A1 * | 11/2012 | Acuna | H04L 67/1097 709/223 |

* cited by examiner

*Primary Examiner* — Henry Tsai
*Assistant Examiner* — John B Roche
(74) *Attorney, Agent, or Firm* — William K. Konrad; Konrad Raynes Davda & Victor LLP (57) ABSTRACT

Provided are a computer program product, system, and method for adapter configuration in accordance with one embodiment of the present description, in which a set of configuration data structures including both a primary and a secondary configuration data structure, may be automatically created by automatic adapter configuration control logic. Upon detection of the replacement of the original host adapter with a replacement host adapter, the primary configuration data structure, for example, may be automatically selected to configure the replacement host adapter. In the event of a failure in the configuration process, the secondary configuration data structure may be automatically selected to configure the replacement host adapter. Other aspects of adapter configuration in accordance with the present description are described.

20 Claims, 5 Drawing Sheets

ADAPTER CONFIGURATION FOR A STORAGE AREA NETWORK

BACKGROUND OF THE INVENTION

1. Field of the Invention

The present invention relates to a computer program product, system, and method for adapter configuration in a computing system having a storage area network.

2. Description of the Related Art

In certain computing environments, a storage area network provides data paths between multiple host systems and multiple storage control units controlling multiple storage devices e.g., a Direct Access Storage Device (DASD), Redundant Array of Independent Disks (RAID), Just a Bunch of Disks (JBOD), etc. The data paths through the storage area network typically include switches and communication links. Portions of the data paths may be formed of fiber optic or other types of cables or may be wireless, for example.

Input/output commands issued by a host are directed through the storage area network over data paths to a port of a storage control unit. A host typically connects to a data path through a host adapter which has a host port connected to a communication link of the data path. Write data issued by the host as well as read data received by the host, typically passes through the host adapter of the particular data path.

Before a host adapter becomes operational for data input and output operations, the host adapter is typically configured for operation in the particular storage area network. Configuration parameters may include the topology of the data path to which the host adapter belongs. For example, one aspect of the topology configuration may include whether the host adapter port connects directly via a communication link to a port of a storage controller, or whether there is an intermediate switch in the data path between the host and the storage controller. Other possible configuration parameters include network protocols, the transmission wavelength for fiber optic networks, and the selection of on/off procedures for turning the adapter on or off so as to minimize disruption to data transfer operations.

Each host adapter of a host typically has a specified data carrying capability. In order to improve or upgrade the data transfer rate, a host adapter may be removed and replaced with a replacement unit having a greater data carrying capability. The replacement host adapter is then configured for operation in the particular storage area network and data transfer operations may resume through the replacement host adapter.

SUMMARY

Provided are a computer program product, system, and method for adapter configuration in accordance with one embodiment of the present description, in which an automatic adapter configuration control logic in a computing system having a host, a storage area network, and storage, is configured for automatic operations to automatically configure a host adapter coupling a host to a data path of the storage area network. In one embodiment, the automatic adapter configuration control logic is configured to automatically select a first configuration data structure from a set of configuration data structures including a primary configuration data structure and a secondary configuration data structure, each configuration data structure of the set containing configuration data for a first host adapter of the host.

The configuration control logic is further configured to attempt to configure a second host adapter replacing the first host adapter, using the configuration data of the selected first configuration data structure for the first host adapter.

In another aspect of the present description, in the event an attempt by the automatic adapter configuration control logic fails to configure the second host adapter using the selected first data configuration data structure, the automatic adapter configuration control logic is further configured to automatically select a second configuration data structure from the set of configuration data structures, and attempt to configure the second host adapter replacing the first host adapter, using the configuration data of the selected second configuration data structure for the first host adapter.

In another aspect of the present description, the automatic adapter configuration control logic is further configured to, in connection with attempting to configure the second host adapter, attempt to obtain a selected data configuration data structure, and determine whether the selected data configuration data structure is unavailable.

In yet another aspect of the present description, the automatic adapter configuration control logic is further configured to, in connection with attempting to configure the second host adapter, read the selected data configuration data structure, and determine whether the configuration data of the selected data configuration data structure fails to match the configuration requirements of the second host adapter.

In still another aspect of the present description, the configuration data of each configuration data structure includes at least one of data path topology data, data path wavelength data, and data path on/off procedure data.

In yet another aspect of the present description, the automatic adapter configuration control logic is further configured to prior to replacement of the first host adapter with the second host adapter, capture the configuration data of the first host adapter when installed in the host, create the set of configuration data structures including the primary and secondary configuration data structures and store the captured configuration data into both the primary and secondary configuration data structures of the set of configuration data structures.

In still another aspect of the present description, the automatic adapter configuration control logic is further configured to, prior to replacement of the first host adapter with the second host adapter, store the primary and secondary configuration data structures on different storage nodes of the storage area network.

Other aspects of adapter configuration in accordance with the present description are described.

DETAILED DESCRIPTION

In one aspect of the present description, an adapter such as a replacement host adapter replacing a host adapter previously installed in a storage area network, may be automatically configured to reduce or eliminate user involvement in the configuration process. In another aspect, the automatic configuration of the replacement host adapter includes robust recovery from configuration errors to successfully achieve configuration of the replacement host adapter notwithstanding encountering one or more errors over the course of the automatic configuration process.

In one embodiment, a set of configuration data structures which includes both a primary and a secondary configuration data structure, may be automatically created by automatic adapter configuration control logic prior to the user replacing the original host adapter with the replacement host adapter. For example, configuration data identifying the configuration of the original host adapter may be automatically captured and stored by the configuration control logic in not only a primary configuration data structure such as a self-describing primary configuration data file, but also in a secondary configuration data structure such as a self-describing secondary configuration data file.

As used herein, a self-describing file is a file in which data may be accessed by name and class rather than by position within the data file or data structure. In one embodiment, the configuration data stored in each configuration data structure for a host adapter may include, for example, data path topology data, data path wavelength data, and I/O path vary off and vary on method selection data, for example.

It is appreciated that the type of configuration data stored for a host adapter may vary, depending upon the particular application. It is further appreciated that configuration data files may be of a type other than self-describing such as data files in which data is accessed by position within the file or data structure. Furthermore, configuration data may be stored in data structures other than files such as in registers, for example.

In another aspect of the present description, the automatic adapter configuration control logic of the illustrated embodiment can automatically detect the replacement of the original host adapter with a replacement host adapter. Upon such detection, a configuration data structure such as the primary configuration data structure, for example, may be automatically selected by the configuration control logic from the set of configuration data structures. As previously mentioned, each configuration data structure of the set contains configuration data for the original host adapter which was replaced.

In accordance with another aspect of the present description, the automatic adapter configuration control logic can automatically attempt to configure a second host adapter such as a replacement host adapter replacing the original host adapter, using the configuration data of the selected configuration data structure. It is appreciated that such an attempt may fail due to various factors. For example, the selected data structure may be unavailable due to a hardware or software failure at the node of the storage area network at which the selected configuration data structure was stored. In another example, the configuration attempt may fail due to a mismatch between the configuration data of the selected configuration data structure and the configuration requirements of the second or replacement host adapter to be configured.

Upon a determination that the configuration attempt for the selected adapter configuration data structure has failed, a second configuration data structure such as the secondary configuration data structure, for example, may be automatically selected by the configuration control logic from the set of configuration data structures. In accordance with another aspect of the present description, the automatic adapter configuration control logic can automatically attempt a second time to configure a second host adapter such as a replacement host adapter replacing the original host adapter, but using the configuration data of the second selected configuration data structure instead of the first selected configuration data structure.

In another aspect of the present description, the secondary configuration data structure may be stored on a node of the storage area network, which is different from the node of the storage area network on which the primary configuration data structure was stored. As a consequence, it is less likely that a hardware or software failure which rendered the primary configuration data structure unavailable or not usable, would similarly render the secondary configuration data structure unavailable or unusable as well. Accordingly, automatic adapter configuration in accordance with the present description may have increased reliability as well as provide a reduction in user involvement in the configuration process.

Thus, adapter configuration for a host adapter in a storage area network, in one aspect of the present description, provides for the creation of multiple copies of configuration data files, for example, one primary and one or more secondary/backup files and storing them on multiple nodes. It is appreciated herein that storing configuration data files on multiple nodes allows the automatic configuration control logic to retrieve the configuration information even if one of the nodes is offline or unavailable. For example, by having multiple redundant copies of the configuration data files, the risk of the automatic configuration process failing due to a configuration data file missing as a result of an accidental deletion or a hard drive failure, may be reduced.

As used herein, the term "automatic" includes fully automatic, that is operations performed by one or more hardware or software controlled machines with no human intervention such as user inputs to a graphical user interface. As used herein, the term "automatic" further includes predominantly automatic, that is, most of the operations (such as greater than 50%, for example) are performed by one or more hardware or software controlled machines with no human intervention such as user inputs to a graphical user interface, and the remainder of the operations (less than 50%, for example) are performed manually, that is, the manual operations are performed by one or more hardware or software controlled machines with human intervention such as user inputs to a graphical user interface to direct the performance of the operations.

Figure 1A:
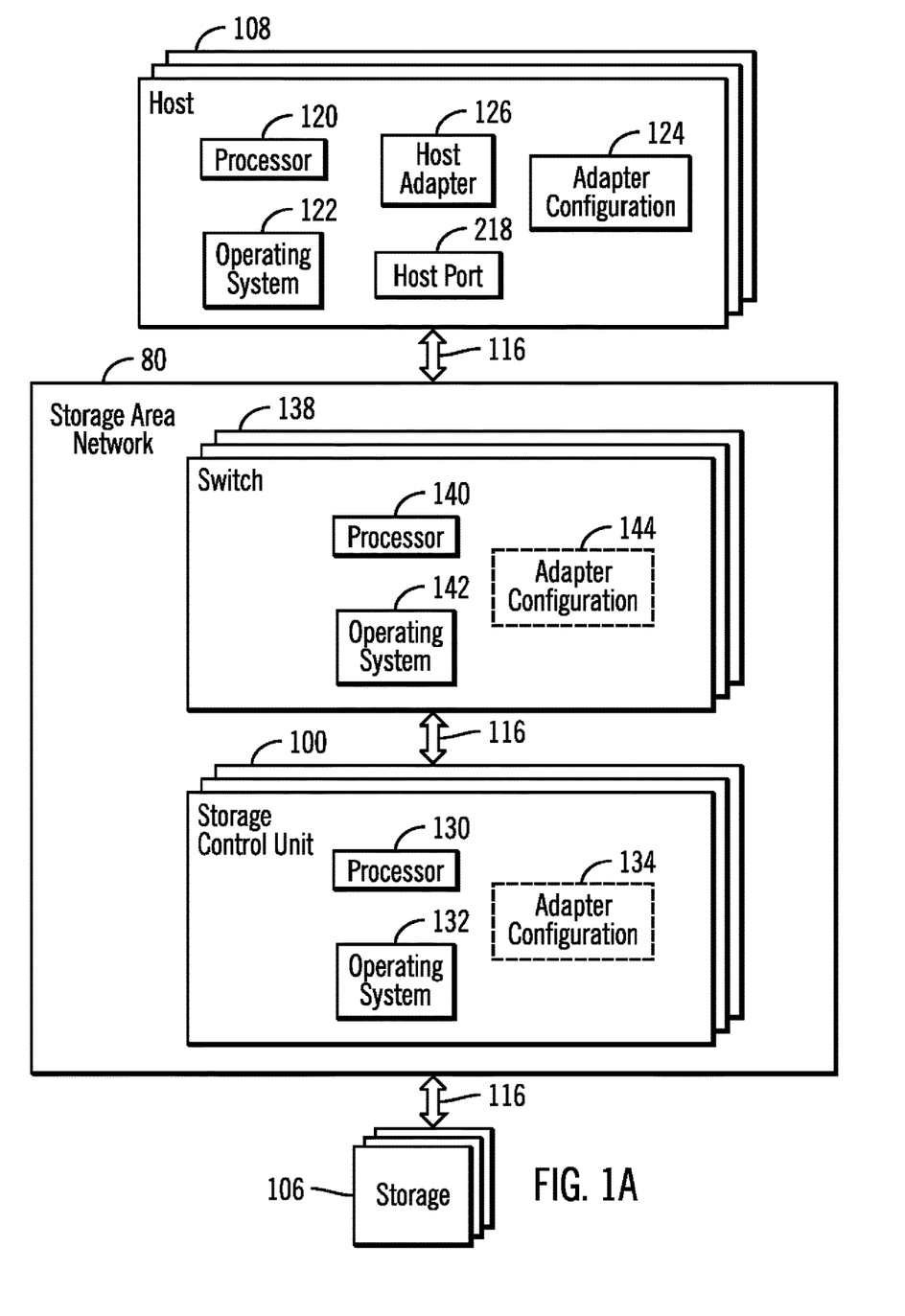
FIG. 1A illustrates an embodiment of a computing system in a storage environment, employing aspects of adapter configuration in accordance with the present description.

FIG. 1A illustrates an embodiment of a computing environment including a storage area network 80 having one or more storage controllers or storage control units, such as a server or storage control unit 100, that manages access to data stored in one or more storage devices such as a storage or storage unit 106, by one or more hosts as represented by a host 108 (FIG. 1A). The storage area network provides data paths for input/output data transfer operations between the hosts 108 and the storage control units 100 of the storage area network 80. The storage control unit 100 is configured to control the storage 106 in response to input/output requests transmitted by a host 108 over the data path between the host and the storage controller.

Figure 1B:
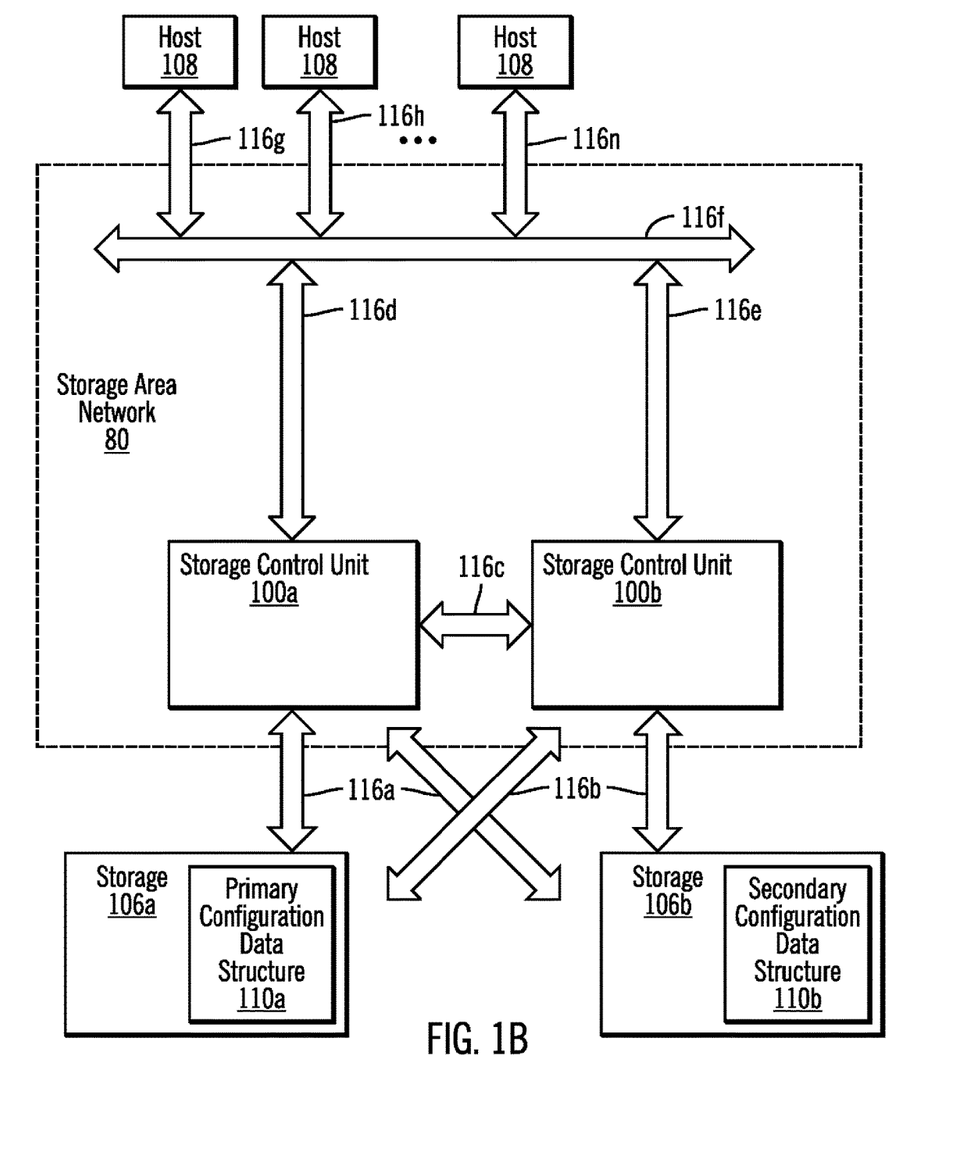
FIG. 1B illustrates another embodiment of a computing system in a storage environment, employing aspects of adapter configuration in accordance with the present description.

In one embodiment, each storage control unit 100 may represent a cluster of processing nodes including a storage control unit 100a (FIG. 1B) for a storage 106a similar to the storage 106 (FIG. 1A), and another storage control unit 100b for additional storage 106b similar to the storage 106 (FIG. 1A). As previously mentioned, in one aspect of the present description, adapter configuration for a host adapter in a storage area network, provides for the creation of multiple copies of configuration data files, for example, one primary and one or more secondary (or redundant or backup) configuration data files and storing them on multiple nodes. For example, FIG. 1B depicts a primary configuration data structure 110a containing a self-describing primary configuration data file stored in the storage 106a of one processing node of the cluster, and a secondary data structure 110b containing a redundant or backup self-describing configuration data file stored in another storage 106b of a different processing node of the cluster. It is appreciated herein that storing a set of configuration data files on multiple nodes allows the automatic configuration control logic to retrieve the configuration information even if one of the nodes is offline or one of the configuration data files is unavailable. Thus, by having multiple redundant copies of the configuration data files, the risk of the automatic configuration process failing due to a configuration data file missing as a result of an accidental deletion or a hard drive failure, may be reduced.

Data may be stored in the form of files in storage volumes of the storage devices 106a, 106b (FIG. 1B), which may be in a peer-to-peer mirror relationship such that data written to one storage volume, typically a primary storage volume in a storage 106a, 106b, is mirrored to a corresponding secondary storage volume in other storage often located in a different geographical location, such that the secondary storage volume is a copy of the primary storage volume. The source of the data written to the storage volumes is typically one or more of the hosts 108. Thus, the hosts 108 issue input/output requests over the storage area network 80 to a storage control unit 100a, 100b requesting the storage control unit 100a, 100b to read data from or write data to the storage volumes of the storage 106a, 106b controlled by the storage control unit 100a, 100b. It is appreciated that adapter configuration in accordance with the present description is applicable to other data processing environments in addition to storage environments having storage volumes in a mirrored, peer-to-peer relationship.

The components of the embodiments depicted in FIGS. 1A, 1B are interconnected by data paths 116 (FIG. 1A), 116a (FIG. 1B), 116b . . . 116n. The data paths 116, 116a, 116b . . . 116n each may comprise one or more networks, such as a Local Area Network (LAN), Storage Area Network (SAN), Wide Area Network (WAN), peer-to-peer network, wireless network, etc. Alternatively, the data paths 116, 116a, 116b . . . 116n may comprise bus interfaces, such as a Peripheral Component Interconnect (PCI) bus or serial interface. The communication links of the data paths may utilize various communication protocols and various transmission media such as wire cables, fiber optic cables, wireless channels, etc.

The storage 106 (FIG. 1A), 106a, 106b (FIG. 1B) may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The computing environment of FIGS. 1A, 1B includes other processing nodes within the hosts 108 and the storage area network 80. Aspects of adapter configuration in accordance with the present description for the storage area network 80 may be implemented in one or more of such processing nodes. For example, each host 108 includes one or more processors 120 (FIG. 1A), an operating system 122 and various software applications. The operating system 122 may comprise the IBM z/OS® operating system or other operating systems for managing input/output operations through a storage area network. (IBM and z/OS are trademarks of IBM worldwide).

Automatic adapter configuration control logic 124 of a host 108 manages aspects of configuration of an adapter such as a host adapter 126 of the host 108, and may be implemented with hardware, software, firmware or any combination thereof. Thus automatic adapter configuration control logic 124 may be separate from the operating system 122 or may be included within the operating system 122, for example. The automatic adapter configuration control logic 124 is configured for automatic operations to automatically configure a host adapter coupling a host to a data path of the storage area network.

Similarly, each storage control unit 100 includes one or more processors 130, an operating system 132 and may include various software applications. The operating system 132 may comprise the IBM z/OS® operating system or other operating systems for managing storage devices in a storage area network. In one embodiment, a storage control unit 100 may optionally include automatic adapter configuration control logic 134 in addition to or instead of the automatic adapter configuration control logic 124 of a host 108, to manage aspects of adapter configuration for adapters of the host 108 of the storage controller 100 of the storage area network 80. The control logic 134 may be implemented with hardware, software, firmware or any combination thereof Thus automatic adapter configuration control logic 134 may be separate from the operating system 132 or may be included within the operating system 132, for example.

The storage area network 80 may further comprise a plurality of switches 138 which are configured to switch data paths within the storage area network to provide for data transfers from a selected host 108 to a selected storage control unit 100. In this embodiment, each switch 138 includes one or more processors 140, an operating system 142 and may include various software applications. The operating system 142 may comprise an appropriate switch operating system or other operating systems for managing data paths in a storage area network. In one embodiment, a switch 138 may optionally include automatic adapter configuration control logic 144 in addition to or instead of the automatic adapter configuration control logic 124 of a host 108 or the automatic adapter configuration control logic 134 of a storage control unit 100, to manage aspects of adapter configuration for adapters of the host 108 or the storage controller 100 of the storage area network 80. The control logic 144 may be implemented with hardware, software, firmware or any combination thereof Thus automatic adapter configuration control logic 144 may be separate from the operating system 142 or may be included within the operating system 142, for example.

Figure 2:
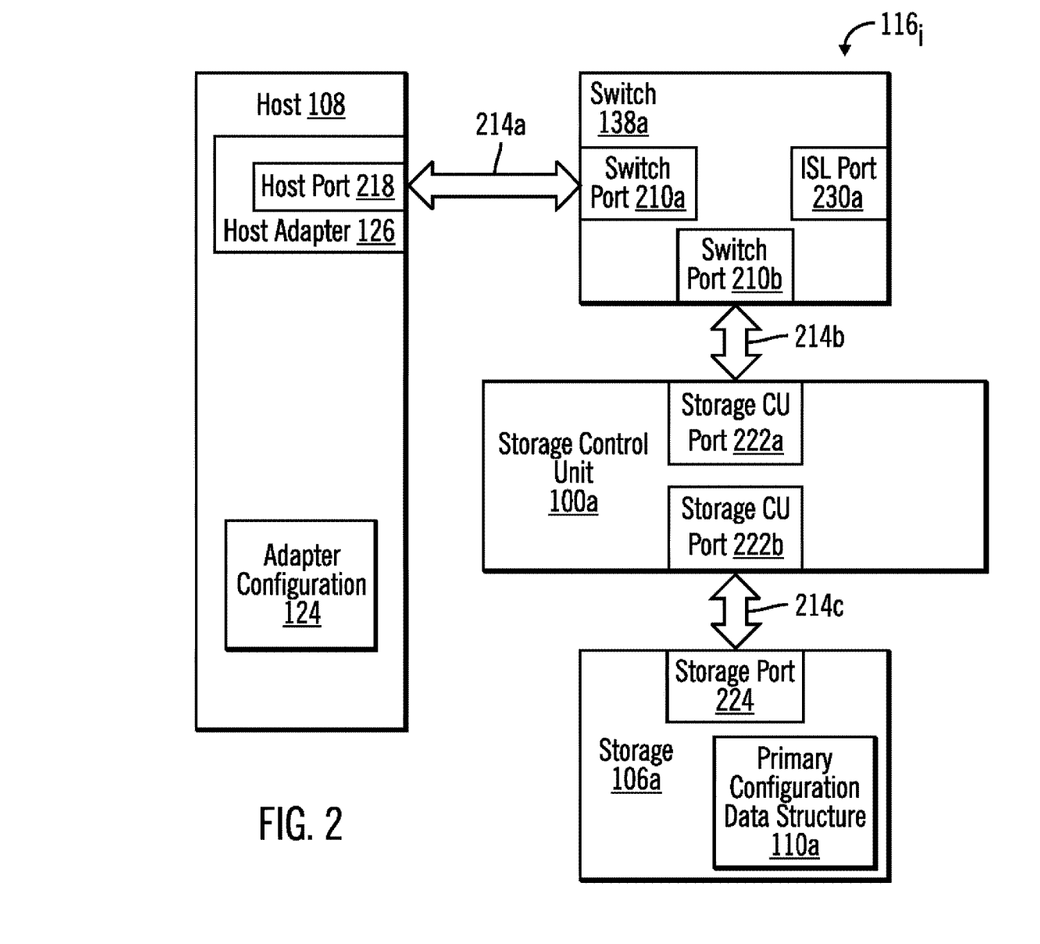
FIG. 2 illustrates another embodiment of a computing system in a storage environment, employing aspects of adapter configuration in accordance with the present description.

FIG. 2 shows an example of one topology of a data path 116*i* of the storage area network in which the host adapter 126 has a host port 218 coupled by a communication link 214*a*, to a switch port 210*a* of a switch 138*a* of the storage area network 80. The switch 138*a* has another port 210*b* coupled by a communication link 214*b* to a storage control unit port 222*a* of the storage control unit 100*a*. The switch 138*a* also has an inter switch link (ISL) port 230*a* for coupling by a communication link to another switch of the storage area network. Thus, in this topology, the host adapter 126 is configured for data transfers between the host 108 and the storage control units 100*a*, via the data path 116*i* which includes the switch 138*a*, respectively. Thus, the host adapter 126 is configured to transmit input/output requests and output data over the data path to the storage control units or storage controllers and receive input data from the storage controller over the data path. It is appreciated that the host adapter 126 may have additional ports and may be coupled to additional storage control units through additional switches of additional data paths. It is further appreciated that in other topologies, the host adapter 126 may be connected directly to a storage control unit without intervening switches. The host port 218 may be a part of the host adapter 126, or a part of the host 108 or another intermediate device.

In one embodiment, the topology of the data path 116*i* depicted in FIG. 2 between the host 108 and the storage control unit 100*a* includes a particular protocol such as the Fibre Connection (FICON) communication protocol often used with fiber optic components. Although described in one embodiment in connection with fiber channel links and the Fibre Connection (FICON) communication protocol, it is appreciated that adapter configuration for a storage area network in accordance with the present description may be applied to other types of communication links and protocols. For example, adapter configuration in accordance with the present description may be utilized for components complying with the Extended Link Services (ELS) protocol.

The storage control unit 100*a* has another storage control unit port 222*b* which is connected by a communication link 214*c* to a storage port 224 of the storage 106*a*. It is appreciated that the storage control unit 100*a* may be coupled to other storage devices such as the storage 106*b* as described above.

Figure 3A:
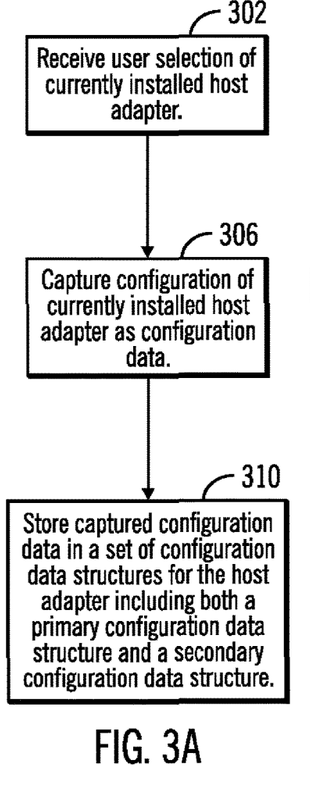
FIGS. 3A-3B illustrate embodiments of operations of an automatic adapter configuration control logic in accordance with the present description.
Figure 3B:
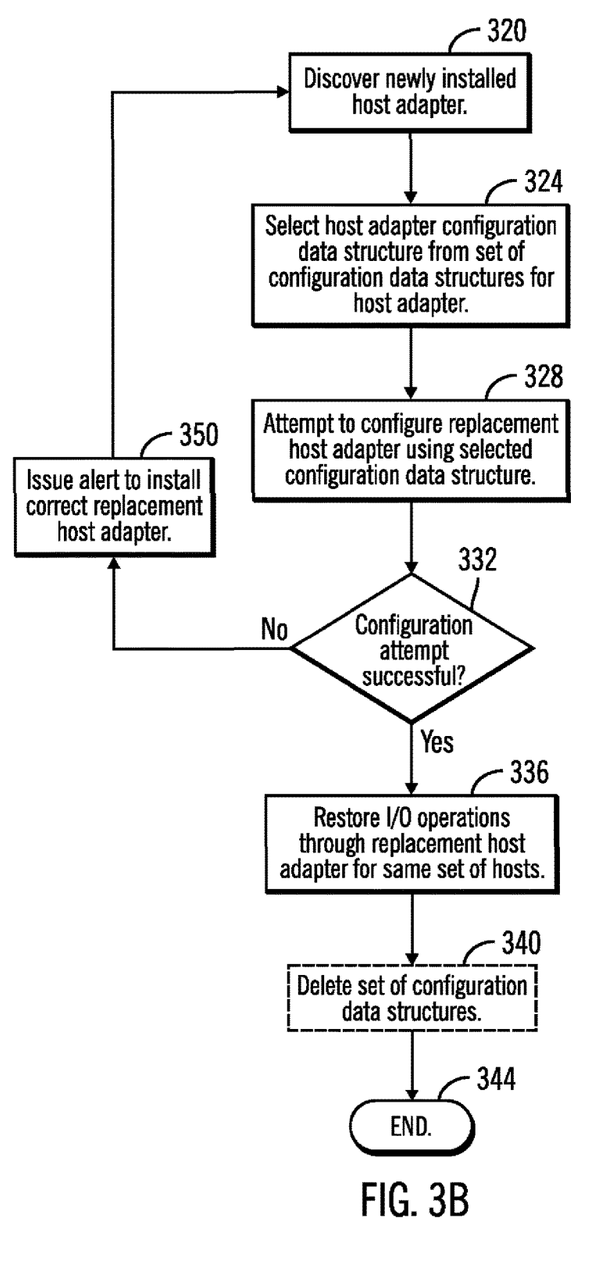

FIGS. 3A-3B illustrate embodiments of operations performed by an automatic adapter configuration control logic in accordance with the present description, such as the automatic adapter configuration control logic 124 (FIG. 1A, 2) for configuration of adapters of the storage area network. In one embodiment, the automatic adapter configuration control logic 124 is configured to automatically perform the adapter configuration operations depicted in FIGS. 3A and 3B. Such configuration control logic may be implemented in hardware, software, firmware or selected combinations thereof.

FIG. 3A is directed to one embodiment of configuration operations in accordance with the present description, which includes automatic creation of the set of primary and redundant configuration data files in anticipation of an upgrade of a host adapter of the computing system of FIGS. 1A, 1B, 2, such as the host adapter 126, for example. In one operation, the automatic adapter configuration control logic 124 receives (block 302) the user selection of an existing host adapter currently installed in the computing system. The selected host adapter may be upgraded by replacing it with a different host adapter which may have improved performance characteristics, for example.

In response to the selection, the automatic adapter configuration control logic 124 automatically captures (block 306) the configuration of the selected, currently installed host adapter in the form of configuration data. Such configuration data may be obtained using a variety of techniques depending upon the particular application. For example, in some systems, configuration data may be obtained by issuing commands and receiving responses containing configuration data defining the configuration of the selected, currently installed host adapter. In addition, configuration data may be obtained in some systems by reading data structures such as files or registers containing configuration information defining the configuration of the selected host adapter. It is appreciated that the configuration data for the selected host adapter may be captured using other techniques, depending upon the particular application.

The captured configuration data for the selected, currently installed host adapter may be stored (block 310) in a set of configuration data structures for the selected host adapter. In accordance with one aspect of the present description, the set of configuration data structures may include a primary configuration data structure storing a primary self-describing configuration data file, for example, and may also include one or more secondary or backup self-describing configuration data structures, each containing a secondary configuration data file, for example.

In another aspect of the present description, the primary and secondary configuration data structures may be stored on different processing nodes to enhance survivability of at least one of the configuration data structures of the set. As previously mentioned, FIG. 1B depicts an example of a primary configuration data structure 110*a* stored on the storage 106*a* of one processing node and the secondary configuration data structure 110*b* stored on the storage 106*b* of a different processing node.

FIG. 3B is directed to another embodiment of configuration operations in accordance with the present description, which includes automatic configuration of a currently installed replacement host adapter that has replaced the selected, previously installed host adapter of FIG. 3A. The automatic configuration operations of this embodiment employ the primary and redundant configuration data files generated as described in connection with FIG. 3A, in anticipation of an upgrade of a host adapter of the computing system of FIGS. 1A, 1B, 2, such as the host adapter 126, for example.

Once the replacement host adapter has been installed in the computing system, the automatic adapter configuration control logic 124 automatically discovers (block 320, FIG. 3B) and integrates the newly installed host adapter into the computing system. Such discovery and integration may be performed using a variety of techniques, depending upon the particular application. For example, in some systems, attaching new hardware to a system may generate an interrupt which is received by the automatic adapter configuration control logic 124 which may include a portion of the operating system of the computing system. In response to the interrupt, the automatic adapter configuration control logic 124 may identify the new hardware attached to the system as a host adapter replacing the previously installed host adapter selected for replacement.

Alternatively, the automatic adapter configuration control logic 124 which may include a portion of the operating system of the computing system, may periodically poll devices of the computing system and detect that new hardware has been attached to the computing system. The new hardware attached to the computing system may be identified and integrated into the computing system using various techniques such as issuing commands to the new hardware, for example. Other techniques may be utilized depending upon the particular application.

Upon discovery and integration of the replacement host adapter, the automatic adapter configuration control logic 124 automatically selects (block 324, FIG. 3B) a host adapter configuration data structure from the set of configuration data structures generated (FIG. 3A) for the selected, previously installed host adapter. As previously mentioned, the set of configuration data structures may include a primary configuration data structure storing a primary self-describing configuration data file, for example, and may also include one or more secondary or backup configuration data structures, each containing a secondary self-describing configuration data file, for example. Thus, in one example, the automatic adapter configuration control logic 124 automatically attempts to select (block 324, FIG. 3B) a primary self-describing configuration data file of a primary configuration data structure 110*a* stored on the storage 106*a* of one processing node.

In one embodiment, the automatic adapter configuration control logic 124 automatically confirms the existence of a set of multiple configuration data structures which may include primary and secondary configuration data structures to facilitate completion of the automatic configuration process by the automatic adapter configuration control logic 124 in the event of an error occurring in the course of the automatic configuration process. In addition, in one embodiment, the automatic adapter configuration control logic 124 can select a particular set of multiple configuration data structures as a function of the identification of the discovered host adapter so that the configuration data of the selected set is compatible with the configuration requirements of the identified host adapter added to the system.

A configuration data structure may become unavailable due to a variety of factors. For example, communication with the processing node upon which the particular configuration data structure is stored may be disrupted due to a hardware or software failure in the data path to the processing node. Alternatively, a hardware or software failure of the processing node storing the configuration data structure may render the configuration data structure unavailable. For example, a hardware or software failure in one or both of the storage control unit and the storage of the processing node may render the configuration data structure stored at that processing node unavailable. In yet another example, the configuration data structure of a processing node may have been inadvertently deleted. As such, unavailability of the selected configuration data structure may cause the attempt to select that configuration data structure to fail.

In one embodiment, the automatic adapter configuration control logic 124 may automatically determine that the primary configuration data structure is unavailable and automatically select (block 324) a configuration data structure from the redundant or backup configuration data structures. In other embodiments, upon the automatic adapter configuration control logic 124 determining that the primary configuration data structure is unavailable, a user or operator may be alerted. In response to the alert, the user or operator may restart the automatic configuration process causing the automatic adapter configuration control logic 124 to automatically select (block 324) a redundant or backup configuration data structure.

Thus, if the attempt by the automatic adapter configuration control logic 124 to select (block 324, FIG. 3B) a primary self-describing configuration data file is unsuccessful, the automatic adapter configuration control logic 124 automatically selects (block 324, FIG. 3B) another host adapter configuration data structure from the set of configuration data structures generated (FIG. 3A) for the selected, previously installed host adapter. Accordingly, in one example, the automatic adapter configuration control logic 124 automatically selects (block 324, FIG. 3B) the secondary or backup configuration data file of the secondary configuration data structure 110*b* stored on the storage 106*b* of another processing node if the primary configuration data file of the primary configuration data structure 110*a* stored on the storage 106*a* is unavailable. In one embodiment, the selected backup or redundant configuration data file may be redesignated the primary configuration data file.

Using the configuration data of the selected (block 324, FIG. 3B) configuration data structure, the automatic adapter configuration control logic 124 automatically attempts (block 328, FIG. 3B) to configure the discovered replacement host adapter. As previously mentioned, in one embodiment, the configuration data of the selected configuration data structure may include at least one of data path topology data, data path wavelength data, and data path on/off procedure selection data, depending upon the particular application.

The automatic adapter configuration control logic 124 automatically determines (block 332, FIG. 3B) whether the attempt (block 328) to configure the replacement host adapter using the selected configuration data structure was successful. If so, input/output (I/O) operations are restored (block 336) for the same set of hosts previously utilizing the selected, previously installed host adapter. However, the restored input/output operations are directed through the currently installed and fully configured replacement host adapter instead of the previously installed host adapter replaced by the replacement host adapter. In this manner, the replacement host adapter may be fully configured automatically by the automatic adapter configuration control logic 124 with little or no user intervention. In some embodiments, the set of configuration data structures may be deleted (block 340) upon completion (block 344) of the configuration process, depending upon the particular application.

An attempt (block 328) to configure the discovered host adapter may fail if the automatic adapter configuration control logic 124 determines (block 332) that the configuration data of the selected (block 324) configuration data structure fails to match the configuration requirements of the replacement host adapter. Accordingly, in attempting to configure the replacement host adapter, the automatic adapter configuration control logic 124 may automatically read the selected configuration data structure and verify whether the hardware and software configuration requirements of the newly installed host adapter are compatible with the configuration data of the selected configuration data structure. Thus, the attempt to configure the replacement host adapter may fail if the automatic adapter configuration control logic 124 determines that the configuration data of the selected configuration data structure fails to match the configuration requirements of the discovered host adapter.

Such a mismatch between configuration data of a selected configuration data structure and the configuration requirements of the replacement host adapter may occur due to a variety of factors. For example, a replacement host adapter may have been installed having configuration requirements incompatible with the configuration data of the selected configuration data structure.

In one embodiment, upon the automatic adapter configuration control logic 124 determining (block 332) that the configuration data of the selected (block 324) configuration data structure fails to match the configuration requirements of the replacement host adapter, a user or operator may be alerted (block 350). In situations where an incorrect host adapter having incompatible configuration requirements was installed, the user may, in response to the alert, replace the incorrect host adapter with the correct, compatible host adapter and restart the automatic configuration process as described above.

Although described in connection with configuration of a replacement host adapter, in some embodiments, the automatic adapter configuration control logic 124 can discover (block 320) and identify a new host adapter being added to the computing system which does not replace an already installed host adapter. In response to the discovery of the added host adapter, a configuration data structure may be selected (block 324) from a set of configuration data structures compatible with the configuration requirements of the identified host adapter which was discovered. Each newly discovered host adapter may be automatically configured using a compatible set of configuration data structures as described above.

Figure 4:
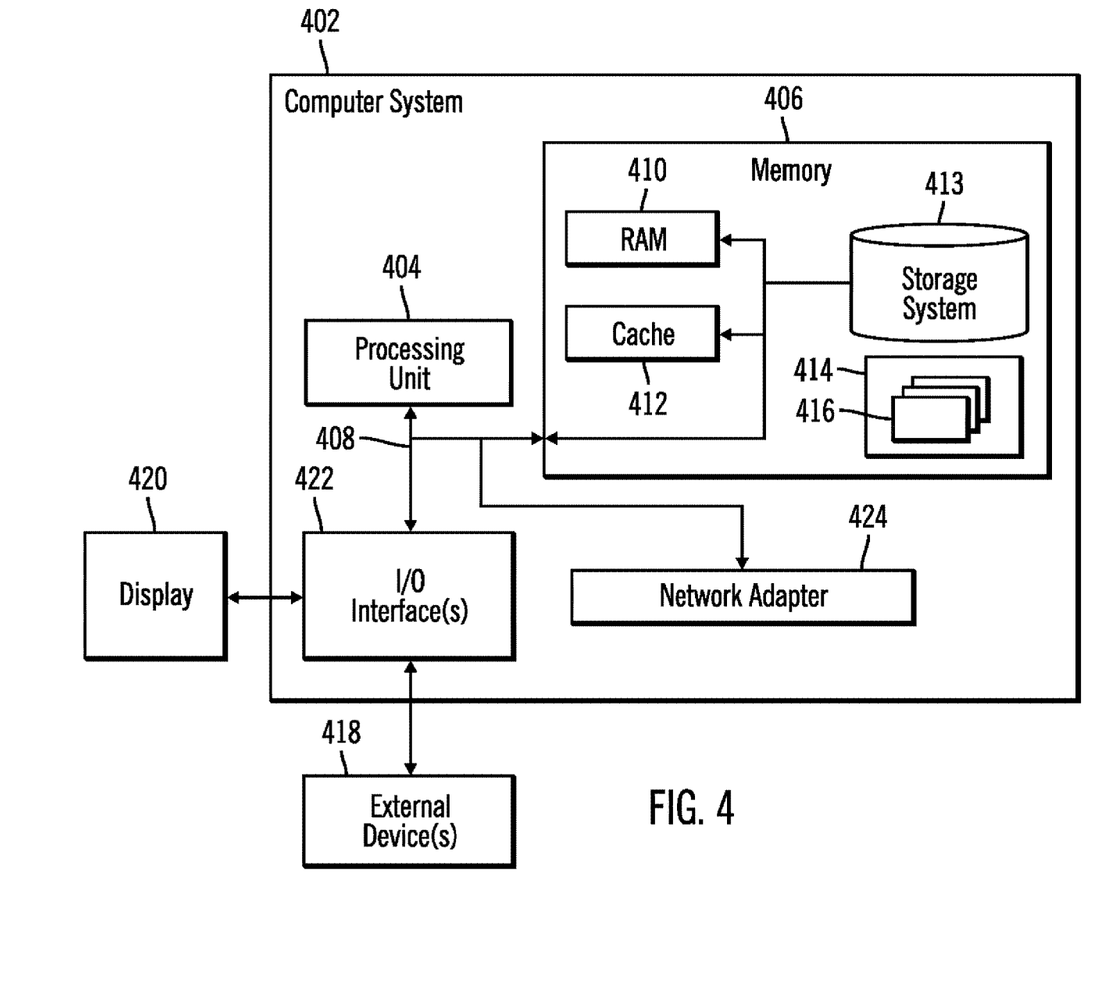
FIG. 4 illustrates a computing environment in which components of FIGS. 1A, 1B and 2 may be implemented.

The computational components of FIGS. 1A, 1B, and 2 including the host 108, switches 138 and the controller or storage control unit 100, 100a, 100b, may each be implemented in one or more computer systems, such as the computer system 402 shown in FIG. 4. Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system/server 402 is shown in the form of a general-purpose computing device. The components of computer system/server 402 may include, but are not limited to, one or more processors or processing units 404, a system memory 406, and a bus 408 that couples various system components including system memory 406 to processor 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. The components of the computer 402 may be implemented as program modules 416 which generally carry out the functions and/or methodologies of embodiments of the invention as described herein. The systems of FIGS. 1A, 1B, 2 may be implemented in one or more computer systems 402, where if they are implemented in multiple computer systems 402, then the computer systems may communicate over a network.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    automatic operations of a processor in a computing system having a host, a storage area network, storage wherein the storage area network includes at least one storage controller and a data path coupling the host to the storage controller wherein the storage controller is configured to control the storage in response to input/output requests transmitted by the host over the data path between the host and the storage controller, said host having at least one host adapter coupling the host to the data path and configured to transmit input/output requests and output data over the data path to the storage controller and receive input data from the storage controller over the data path, said automatic operations of a processor including:
    selecting a configuration data structure from a set of selectable configuration data structures including a primary configuration data structure which is a first copy of a configuration data structure and a secondary configuration data structure which is a second, backup copy of the primary configuration data structure, each selectable configuration data structure of the set containing a copy of configuration data for configuring a first host adapter of the host; and
    attempting to configure a second host adapter replacing the first host adapter, using the configuration data of the selected configuration data structure for the first host adapter.

2. The method of claim 1, wherein selecting a configuration data structure includes:
    attempting to obtain a first configuration data structure from the set of configuration data structures including the primary configuration data structure and the secondary configuration data structure; and
    upon failing to obtain the first configuration data structure, selecting a second configuration data structure from the set of configuration data structures.

3. The method of claim 2 wherein the attempting to configure the second host adapter includes using the configuration data of the selected second configuration data structure to configure the second host adapter replacing the first host adapter.

4. The method of claim 1 wherein the attempting to configure the second host adapter includes reading the selected configuration data structure, and determining whether configuration data of the selected configuration data structure fails to match configuration requirements of the second host adapter.

5. The method of claim 1 wherein the configuration data of a configuration data structure of the set includes at least one of data path topology data, data path wavelength data, and data path on/off procedure data.

6. The method of claim 1 wherein the automatic processor operations further include:
    prior to replacement of the first host adapter with the second host adapter, capturing the configuration data of the first host adapter when installed in the host;
    creating the set of configuration data structures including the primary and secondary configuration data structures; and
    storing the captured configuration data into both the primary and secondary configuration data structures of the set of configuration data structures.

7. The method of claim 6 wherein the automatic processor operations further include storing the primary and secondary configuration data structures on different storage nodes of the storage area network.

8. A computer program product for an adapter configuration control logic of a storage area network of a computing system having a host, storage, and a storage area network which includes at least one storage controller and a data path coupling the host to the storage controller wherein the storage controller is configured to control the storage in response to input/output requests transmitted by the host over the data path between the host and the storage controller, said host having at least one host adapter coupling the host to the data path and configured to transmit input/output requests and output data over the data path to the storage controller and receive input data from the storage controller over the data path, wherein the computer program product comprises a computer readable storage medium having program instructions embodied therewith, the program instructions executable by a processor of the adapter configuration control logic to cause automatic operations, the automatic operations of a processor comprising:
    selecting a configuration data structure from a set of selectable configuration data structures including a primary configuration data structure which is a first copy of a configuration data structure and a secondary configuration data structure which is a second, backup copy of the primary configuration data structure, each selectable configuration data structure of the set containing a copy of configuration data for a first host adapter of the host; and attempting to configure a second host adapter replacing the first host adapter, using the configuration data of the selected configuration data structure for the first host adapter.

9. The computer program product of claim 8, wherein selecting a configuration data structure includes:

attempting to obtain a first data configuration data structure from the set of configuration data structures including the primary configuration data structure and the secondary configuration data structure; and upon failing to obtain a first configuration data structure, selecting a second configuration data structure from the set of configuration data structures including the primary configuration data structure and the secondary configuration data structure.

10. The computer program product of claim 9 wherein the attempting to configure the second host adapter includes using the configuration data of the selected second configuration data structure to configure the second host adapter replacing the first host adapter.

11. The computer program product of claim 8 wherein the attempting to configure the second host adapter includes reading the selected configuration data structure, and determining whether configuration data of the selected configuration data structure fails to match configuration requirements of the second host adapter.

12. The computer program product of claim 8 wherein the configuration data of a configuration data structure includes at least one of data path topology data, data path wavelength data, and data path on/off procedure data.

13. The computer program product of claim 8 wherein the automatic processor operations further include:

prior to replacement of the first host adapter with the second host adapter, capturing the configuration data of the first host adapter when installed in the host;

creating the set of configuration data structures including the primary and secondary configuration data structures; and storing the captured configuration data into both the primary and secondary configuration data structures of the set of configuration data structures.

14. The computer program product of claim 13 wherein the automatic processor operations further include storing the primary and secondary configuration data structures on different storage nodes of the storage area network.

15. A computing system, comprising:

at least one host;

at least one storage unit; and a storage area network which includes at least one storage controller and a data path coupling the host to the storage controller wherein the storage controller is configured to control the storage in response to input/output requests transmitted by the host over the data path between the host and the storage controller wherein said host has at least one host adapter coupling the host to the data path and configured to transmit input/output requests and output data over the data path to the storage controller and receive input data from the storage controller over the data path, and wherein at least one of the host and the storage area network has adapter configuration control logic configured to perform automatic host adapter configuration operations, said adapter configuration control logic including a processor and a computer program product wherein the computer program product comprises a computer readable storage medium having program instructions embodied therewith, the program instructions executable by a processor of the adapter configuration control logic to cause automatic operations, the automatic operations of a processor comprising:

selecting a configuration data structure from a set of selectable configuration data structures including a primary configuration data structure which is a first copy of a configuration data structure, and a secondary configuration data structure which is a second, backup copy of the primary configuration data structure, each selectable configuration data structure of the set containing a copy of configuration data for a first host adapter of the host; and attempting to configure a second host adapter replacing the first host adapter, using the configuration data of the selected configuration data structure for the first host adapter.

16. The computing system of claim 15, wherein selecting a configuration data structure includes:

attempting to obtain a first data configuration data structure from the set of configuration data structures including the primary configuration data structure and the secondary configuration data structure; and upon failing to obtain a first configuration data structure, selecting a second configuration data structure from the set of configuration data structures including the primary configuration data structure and the secondary configuration data structure.

17. The computing system of claim 16 wherein the attempting to configure the second host adapter includes using the configuration data of the selected second configuration data structure to configure the second host adapter replacing the first host adapter.

18. The computing system of claim 15 wherein the attempting to configure the second host adapter includes reading the selected configuration data structure, and determining whether configuration data of the selected configuration data structure fails to match configuration requirements of the second host adapter.

19. The computing system of claim 15 wherein the configuration data of a configuration data structure includes at least one of data path topology data, data path wavelength data, and data path on/off procedure data.

20. The computing system of claim 15 wherein the automatic processor operations further include:

prior to replacement of the first host adapter with the second host adapter, capturing the configuration data of the first host adapter when installed in the host;

creating the set of configuration data structures including the primary and secondary configuration data structures;

storing the captured configuration data into both the primary and secondary configuration data structures of the set of configuration data structures; and storing the primary and secondary configuration data structures on different storage nodes of the storage area network.

* * * * *